(12) United States Patent
Huang et al.

(10) Patent No.: US 8,091,118 B2
(45) Date of Patent: Jan. 3, 2012

(54) METHOD AND SYSTEM TO OPTIMIZE EFFICIENCY WHEN MANAGING LISTS OF UNTRUSTED NETWORK SITES

(75) Inventors: Andy Huang, West Chicago, IL (US); David J. Peto, Naperville, IL (US)

(73) Assignee: AT & T Intellectual Property I, LP, Atlanta, GA (US)

( * ) Notice: Subject to any disclaimer, the term of this patent is extended or adjusted under 35 U.S.C. 154(b) by 934 days.

(21) Appl. No.: 11/962,553

(22) Filed: Dec. 21, 2007

(65) Prior Publication Data

US 2009/0164472 A1    Jun. 25, 2009

(51) Int. Cl.
*G06F 17/30* (2006.01)

(52) U.S. Cl. .................. 726/3; 726/4; 726/21

(58) Field of Classification Search ............. 726/4, 26, 726/3, 21
See application file for complete search history.

(56) References Cited

U.S. PATENT DOCUMENTS

| | | | | |
|---|---|---|---|---|
| 7,444,680 | B2 * | 10/2008 | Hurst et al. ............ | 726/25 |
| 7,668,921 | B2 * | 2/2010 | Proux et al. ........... | 709/206 |
| 7,802,298 | B1 * | 9/2010 | Hong et al. ............ | 726/22 |
| 2006/0059223 | A1 * | 3/2006 | Klemets et al. ........ | 709/200 |
| 2007/0039038 | A1 * | 2/2007 | Goodman et al. ...... | 726/2 |
| 2007/0044149 | A1 * | 2/2007 | Xavier et al. .......... | 726/22 |
| 2007/0094500 | A1 * | 4/2007 | Shannon et al. ....... | 713/170 |
| 2007/0112814 | A1 * | 5/2007 | Cheshire ................ | 707/101 |
| 2007/0136806 | A1 * | 6/2007 | Berman ................. | 726/22 |
| 2007/0199054 | A1 * | 8/2007 | Florencio et al. ...... | 726/5 |
| 2007/0219928 | A1 | 9/2007 | Madhogarhia | |
| 2007/0245148 | A1 * | 10/2007 | Buer ..................... | 713/182 |
| 2007/0245422 | A1 * | 10/2007 | Hwang et al. .......... | 726/26 |
| 2007/0283000 | A1 | 12/2007 | Proux et al. | |
| 2008/0034428 | A1 * | 2/2008 | Bejar et al. ............ | 726/23 |
| 2008/0046738 | A1 * | 2/2008 | Galloway et al. ....... | 713/176 |
| 2008/0141342 | A1 * | 6/2008 | Curnyn ................. | 726/3 |
| 2008/0196085 | A1 * | 8/2008 | Nagoya et al. ......... | 726/3 |
| 2008/0313732 | A1 * | 12/2008 | Pierce .................. | 726/22 |
| 2009/0006532 | A1 * | 1/2009 | Sinn et al. ............. | 709/203 |

FOREIGN PATENT DOCUMENTS

WO    WO 2007/007988    *    1/2007

* cited by examiner

*Primary Examiner* — Krisna Lim
(74) *Attorney, Agent, or Firm* — Fay Kaplun & Marcin, LLP

(57) ABSTRACT

A computer readable storage medium including a set of instructions executable by a processor, the set of instructions operable to determine if a network location included in a request to connect to the network location, is included in a first list of untrusted network locations stored on the client computer and send a request to determine if the network location is included in a second list of untrusted network locations stored remotely from the client computer when it is determined that the network location is not included in the first list.

19 Claims, 3 Drawing Sheets

System 100

Local Database Version 115

| Group of Site Identifiers 210 | Group of Access Dates 230 | Group of Usage Counters 220 |
|---|---|---|
| 211 http://www.XXXXXX.com | 2007/07/11 | 8 — 221 |
| 212 http://www.YYYYYY.net | 2007/04/17 | 11 — 222 |
| 213 http://35.21.147.24 | 2007/06/28 | 4 — 223 |
| 214 http://17.21.12.46 | 2007/03/06 | 9 — 224 |

231
232
233
234

METHOD AND SYSTEM TO OPTIMIZE EFFICIENCY WHEN MANAGING LISTS OF UNTRUSTED NETWORK SITES

BACKGROUND

As the number of people using the Internet continues to grow, the number of criminals attempting to prey on them grows accordingly. Phishing is one common criminal practice, whereby criminals attempt to trick their victims into revealing sensitive information by masquerading as trusted entities.

As a result, a variety of anti-phishing techniques have been developed. Using one common technique, a database may be maintained that contains a list of websites that are known to be used for phishing. Such a database may be maintained at a central server that is periodically updated and accessed remotely by clients when the clients wish to verify the safety of a website. Alternately, the database may be maintained at a client system, periodically updated from a central server, and consulted locally when the client wishes to verify the safety of a requested website.

SUMMARY OF THE INVENTION

A computer readable storage medium including a set of instructions executable by a processor, the set of instructions operable to determine if a network location included in a request to connect to the network location, is included in a first list of untrusted network locations stored on the client computer and send a request to determine if the network location is included in a second list of untrusted network locations stored remotely from the client computer when it is determined that the network location is not included in the first list.

A system having a network server storing a first list of untrusted network locations and a client computer receiving a request to connect to a network location, the client computer storing a second list of untrusted network locations, the second list being a subset of the first list, the client computer determining whether the network location is included in the second list and sending a request to determine if the network location is included in the first list when the network location is not included in the second list, wherein the client computer is prevented from connecting to the network location if the network location is included in one of the first and second lists.

A computing device including a web browser receiving a request to connect to a website, a database storing a first list of untrusted websites and a tool receiving the website from the web browser and searching the first list to determine if the website is included in the first list and sending a request to a remote database storing a second list of untrusted websites when the website is not included in the first list.

DETAILED DESCRIPTION

Figures 1, 2:
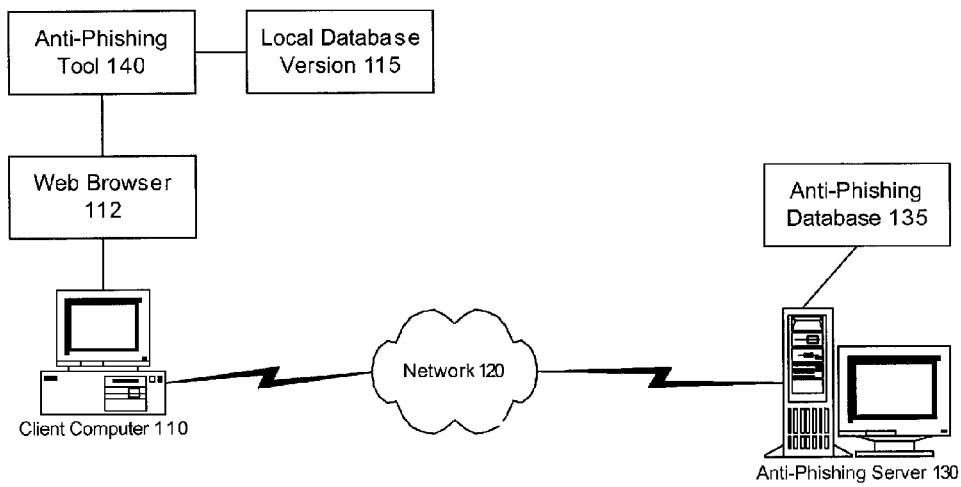
FIG. 1 shows an exemplary system according to the present invention.
FIG. 2 shows an exemplary local phishing site database according to the present invention.

The present invention may be further understood with reference to the following description and the appended drawings, wherein like elements are referred to with the same reference numerals. The exemplary embodiments of the present invention describe a method and system for optimizing the efficiency of the management of website phishing definitions. The exemplary embodiments ensure that vulnerability to phishing is minimized while reducing the use of local and network resources. The exemplary system and method will be discussed in detail below.

Generally, the term "phishing" refers to criminal activity accomplished through social engineering techniques. More specifically, in its most common definition to describe activity taking place over the Internet, phishing typically refers to attempts to fraudulently obtain sensitive information (e.g., usernames and passwords, credit cards, social security numbers, etc.) by masquerading as a trustworthy entity in an online communication. Entities often mimicked by phishers include online stores and auction sites, electronic payment providers, banks, etc.

In a typical phishing attempt, a user will receive an email purporting to be from a trustworthy entity of one of the types described above. Such a phishing email might inform the user that the user's bank account or credit card information has been compromised, or that an attempt to make payment for an online purchase has been unsuccessful. In order to resolve this fictional problem, the user is directed to follow a hyperlink located within the email. The user will be directed to a website that appears identical to that of the trusted entity, but is in fact owned by the phisher. There, the user is told to enter personal information (such as of the types discussed above) to "confirm" the user's identity.

Once the user has done so, the phishing website may inform the user that the problem referred to in the phishing email has been resolved, or it may simply appear to cease to function. Regardless of what occurs at this point, however, the phisher is in possession of the user's personal information, which may be used in any manner common to identity theft crimes (e.g., withdrawing money from the victim's bank account, making purchases on the victim's credit card, opening accounts in the victim's name, etc.).

The above refers to a technique whereby a user is lured to a phishing website by a fraudulent email. However, such solicitations may also occur through pop-up windows triggered by websites the user visits or through any other method designed to lure the user to a phishing website.

One technique that has been developed to combat phishing is the use of anti-phishing databases. Anti-phishing databases typically contain a list of large quantities of website uniform resource locators ("URL") that are known to be used by phishers. Each time a user attempts to navigate to a website, the anti-phishing database is consulted, and if the website the user is attempting to access is known to be a phishing website, the user is alerted and the navigation is canceled.

Under a server-based implementation of an anti-phishing database, every time a user attempts to navigate to a website, an anti-phishing tool (e.g., a browser extension or plug-in) sends the website URL to a server storing the anti-phishing database. If the URL is found to be contained in the database ("blacklisted"), then the navigation is canceled and an alert is sent to be displayed in the browser on the client (i.e. user's) computer. Otherwise, the navigation is continued.

Under a client-based implementation of an anti-phishing server, an anti-phishing tool initially downloads the entire phishing site definition database containing blacklisted domain names and/or URLs to the client computer. Subsequently, when the user attempts to navigate to a website, the anti-phishing tool checks the website domain name and/or URL against the locally stored blacklist. As above, if the user has attempted to navigate to a phishing site, the anti-phishing tool cancels the navigation and alerts the user. Otherwise, the navigation is continued. The anti-phishing tool downloads revisions to the anti-phishing database (either at set intervals or when prompted to do so by the user) to maintain the update status of the locally stored version of the database.

The exemplary embodiment of the present invention integrates aspects of both the server-based and client-based implementations of anti-phishing databases. FIG. 1 shows an exemplary system 100 according to the present invention. The exemplary system 100 may act in accordance with the exemplary methods 300 and 400, shown in FIGS. 3 and 4. The system 100 includes client computer 110 (which may be, for example, a desktop computer, a laptop computer, a palmtop computer, or any other device that is capable of navigating a network). The client computer 110 is connected to a network 120. The network 120 may typically be the Internet; alternately, in implementations of the present invention where the system 100 is maintained by a business entity for the protection of computers used by employees, it may be a corporate intranet. Also connected to the network 120 is an anti-phishing server 130.

The anti-phishing server 130 stores an anti-phishing database 135. The database 135 is substantially as described above; it stores a comprehensive list of websites that have been blacklisted as phishing websites. The websites may be stored in the form of domain names (e.g., www.XXXXXX.com, www.YYYYYY.net, etc.), in the form of IP addresses (e.g., http://35.21.147.24, http://17.21.12.46, etc.), in any other format that may be used to point to a network location, or in a combination of more than one format. The database 135 should ideally be frequently updated to reflect the use of new and/or different sites by phishers. Those of skill in the art will understand that while the foregoing refers specifically to a database storing a list of websites, the present invention is equally applicable to any other type of network location (e.g., an FTP site, a mail server, etc.) Further, those of skill in the art will understand that while the exemplary embodiments discussed herein are specifically directed to phishing websites, the same principles may be applied to restrict access to any other type of untrusted network location (e.g., pornography websites or other websites containing material inappropriate for children, websites relating to illegal file sharing, etc.).

The client computer 110 stores a local database version 115 of the anti-phishing database 135. The local database version 115 is smaller than the database 135. FIG. 2 shows a truncated example of the local database version 115. The local database version 115 contains a group 210 of phishing site identifiers 211, 212, 213, 214. Each of the group 210 of identifiers correlates to one of a group 220 of usage counters 221, 222, 223, 224. Additionally, each of the group 210 of identifiers correlates to one of a group 230 of access dates 231, 232, 233, 234. Those of skill in the art will understand that while FIG. 2 shows an exemplary local database version 115 containing four site identifiers and four corresponding usage counters, the precise number of site identifiers and usage counters will typically be much larger and will vary among different implementations of the present invention. Use of these counters will be described below. The local database version 115 may typically be limited to a preset maximum size (e.g., 4 megabytes, a fixed percentage of the size of the anti-phishing database 135, etc.). The client computer 110 also stores an anti-phishing tool 140. The anti-phishing tool 140 may be, for example, an extension or plug-in for web browser 112.

Figure 3:
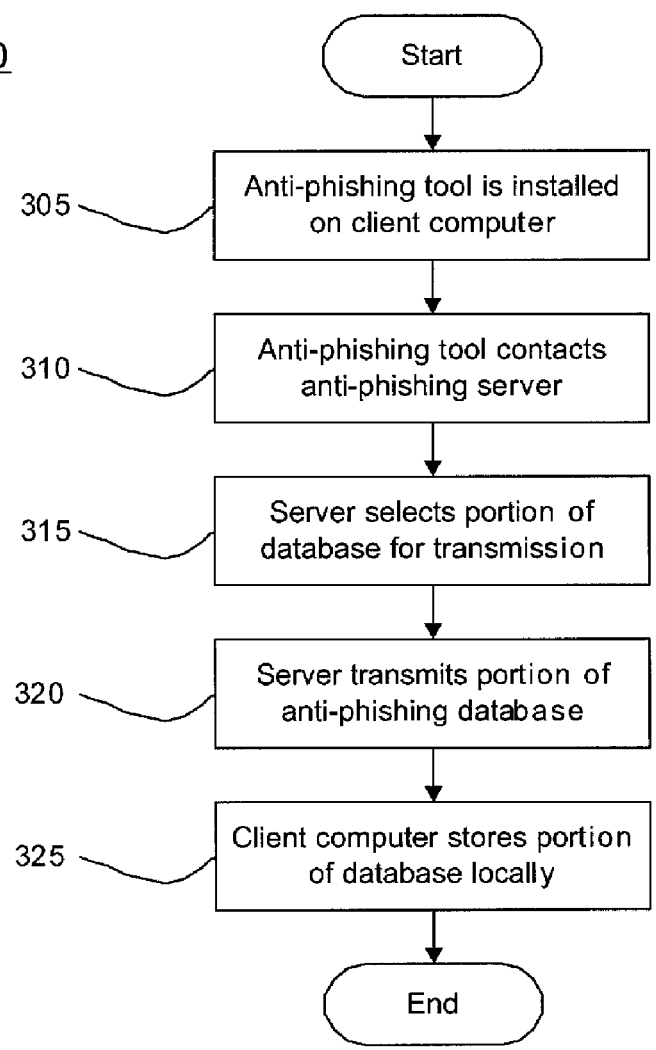
FIG. 3 shows an exemplary method for initializing a phishing site database on a client computer according to the present invention.
Figure 4:
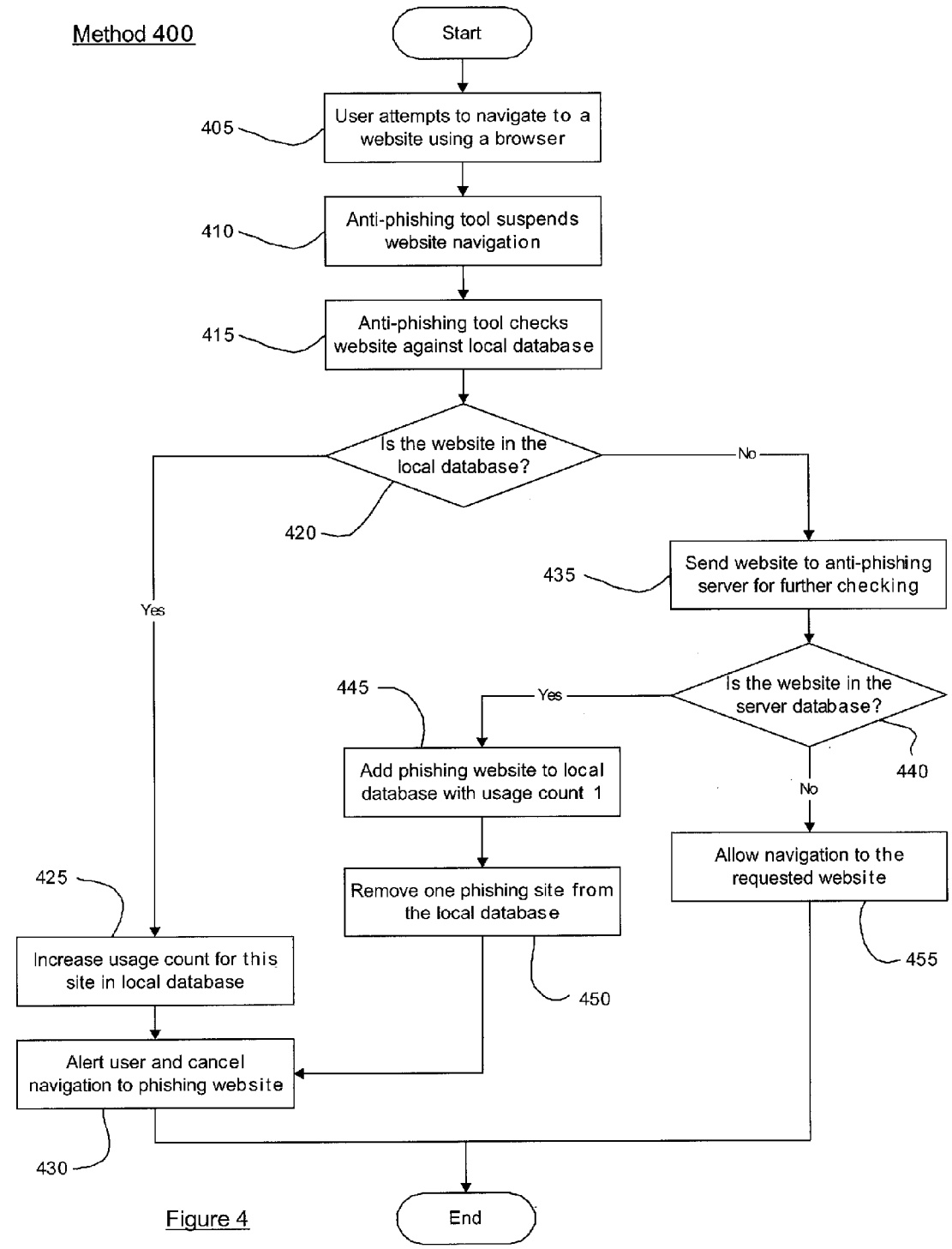
FIG. 4 shows an exemplary method for managing phishing site databases according to the present invention.

As stated above, the exemplary system 100 may operate in accordance with the exemplary methods 300 and 400, respectively shown in FIGS. 3 and 4. FIG. 3 shows the exemplary method 300 by which the local database version 115 is initially created. In step 305, the anti-phishing tool 140 is installed on the client computer 110 (e.g., by running an installation utility that is supplied with the anti-phishing tool). In step 310, the anti-phishing tool 140 initiates communications with the anti-phishing server 130 via network 120. In step 315, the anti-phishing server 130 selects a portion of the anti-phishing database 135 to be sent the client computer 110. The selection of the portion of the anti-phishing database 135 may be made in a variety of manners, such as by selecting the portion of the database 135 that contains phishing sites that are most frequently accessed or by selecting the portion of the database that contains phishing sites that have most recently been added to the database 135. In step 320, the anti-phishing server 130 sends the portion of the database 135 to the client computer 110, also via network 120. In step 325, the client computer 110 stores the received smaller database version locally as the local database version 115.

FIG. 4 shows the exemplary method 400 by which the local database version 115 is utilized and updated. In step 405, the user of the client computer 110 attempts to navigate to a website (e.g., by typing a URL into web browser 112 or by clicking on a link shown in web browser 112 or in an electronic mail message). In step 410, the anti-phishing tool 140 suspends navigation to the requested website. In step 415, the anti-phishing tool 140 checks the requested website against the local database version 115. In step 420, the anti-phishing tool determines whether the requested website matches any of the websites found in the local database version 115.

If the anti-phishing tool 140 finds, in step 420, that the requested website matches an entry in the local database version 115, then the method proceeds to step 425. In step 425, the usage counter corresponding to the requested website is increased by one. For example, referring to FIG. 2, if the requested website matched with site identifier 212, then the usage counter 222 would be increased from a value of 11 to a new value of 12. Following the increase of the usage counter, in step 430 the anti-phishing tool 140 alerts the user (e.g., using a message displayed within the web browser 112) that the requested website is blacklisted for being a phishing website and cancels navigation to the website.

Alternately, if the anti-phishing tool 140 finds, in step 420, that the requested website does not match any of the entries in the local database version 115, further verification is performed. In step 435, the anti-phishing tool 140 sends the requested website to the anti-phishing server 130 for further checking. In step 440, the anti-phishing server 130 determines whether the requested website is blacklisted in the anti-phishing database 135 stored on the anti-phishing server 130. If so, this fact is communicated to the anti-phishing tool 140, and in step 445 the anti-phishing tool 140 creates a new entry for the requested website in the local database version 115, along with a corresponding usage counter which is set to an initial value of one.

After the new entry is created in step 445, a previously existing entry is removed from the local database version 115 in step 450. This step is necessary in order to maintain the size of the local database version 115 at a constant level. The decision of which entry to be removed from the local database version 115 may be made by a variety of algorithms that may streamline the operation of the system 100. For example, this determination may be made using a most recently used ("MRU") algorithm, a most used ("MU") algorithm, or a most least used ("MLU") algorithm.

An MRU algorithm keeps entries in the local database version 115 that have been accessed most recently, while discarding those that have not. This assumes that that phishing websites that have not been seen recently are no longer in use. Applied, this means that the anti-phishing tool will remove from the local database version 115 the entry with the least recent date in the group of access dates 230.

An MU algorithm retains, in the local database version 115, phishing sites with higher usage counters, while discarding sites with lower counters. This assumes that phishing websites that are more frequently seen will continue to be so; therefore, checking for those sites is streamlined.

An MLU algorithm will retain, in the local database version 115, entries that are less commonly used. In practice, this means that the anti-phishing tool 140 will remove from the local database version 115 the entry with the highest value in its usage counter. This assumes that phishing websites with high usage counts will no longer frequently be seen in use because phishers will typically cease to use websites that are known to be phishing websites (and, thus, have already been placed on many blacklists).

Those of skill in the art will be aware that these are only exemplary algorithms that can be used to determine which entries to retain in the local database version 115. Any other algorithm that will accomplish the goal of retaining entries that are most likely to be accessed may also be used. Additionally, in other embodiments of the present invention, the anti-phishing tool 140 may periodically update the local database version 115 with new entries from the anti-phishing database 135 without being prompted to do so by user action. In such embodiments, removal of old entries from the local database version 115 may be performed using one of the algorithms described above or by any other algorithm designed to accomplish the same goals.

Once a website has been removed from the local database version 115 in step 450, the method continues to step 430, where, as above, the user is alerted to the nature of the phishing website and navigation is canceled. In contrast, if, in step 440, the requested website is not found to be in the anti-phishing database 135 stored on the server 130, the method proceeds to step 455, wherein navigation to the requested website is allowed. The method concludes following either step 430 or step 455.

The exemplary embodiments of the present invention provide the same protection against phishing as previous systems and methods for doing so. Additionally, they do so in a manner that reduces storage and memory usage in client computers, reduces processing time, and requires the client computers to communicate with the server less frequently.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer readable storage medium including a set of instructions executable by a processor, the set of instructions operable to:
   determine if a network location included in a request to connect to the network location, is included in a first list of untrusted network locations stored on the client computer; and
   send a request to determine if the network location is included in a second list of untrusted network locations stored remotely from the client computer when it is determined that the network location is not included in the first list.

2. The non-transitory storage medium of claim 1, wherein the instructions are further operable to:
   connect to the network location, if the first and second lists do not include the network location.

3. The non-transitory storage medium of claim 1, wherein the instructions are further operable to:
   prevent the client computer from connecting to the network location if the network location is included in one of the first and second lists; and
   notify a user of the client computer that the network location is included in the one of the first and second lists.

4. The non-transitory storage medium of claim 1, wherein the instruction are further operable to:
   add the network location to the first list, if the network location is not included in the first list and is included in the second list.

5. The non-transitory storage medium of claim 1, wherein the instruction are further operable to:
   remove one of the network locations from the first list, wherein the one of the network locations is selected using one of a most recently used algorithm, a most used algorithm, and a most least used algorithm.

6. The non-transitory storage medium of claim 1, wherein the network location is a website.

7. The non-transitory storage medium of claim 1, wherein the untrusted network locations are phishing websites.

8. The non-transitory storage medium of claim 1, wherein the first list is a subset of the second list.

9. The non-transitory storage medium of claim 1, wherein the first list is a predetermined size.

10. The non-transitory storage medium of claim 9, wherein the predetermined size is one of less than ten megabytes and a fixed percentage of the second list.

11. The non-transitory storage medium of claim 1, wherein the first and second lists are stored in databases.

12. The non-transitory storage medium of claim 1, wherein the first list includes a usage counter corresponding to each untrusted network location, wherein the corresponding usage counter is incremented when it is determined that the network location is included in the first list.

13. A system, comprising:
   a network server storing a first list of untrusted network locations; and
   a client computer receiving a request to connect to a network location, the client computer storing a second list of untrusted network locations, the second list being a subset of the first list, the client computer determining whether the network location is included in the second list and sending a request to determine if the network location is included in the first list when the network location is not included in the second list, wherein the client computer is prevented from connecting to the network location if the network location is included in one of the first and second lists.

14. A computing device, comprising:
   a web browser receiving a request to connect to a website;
   a database storing a first list of untrusted websites; and
   a tool receiving the website from the web browser and searching the first list to determine if the website is included in the first list and sending a request to a remote database storing a second list of untrusted websites when the website is not included in the first list.

15. The computing device of claim 14, wherein the web browser is prevented from connecting to the website when the website is included in one of the first and second lists.

16. The computing device of claim 14, wherein the tool is one of an extension of the web browser and a plug-in for the web browser.

17. The computing device of claim 14, wherein the first list is a subset of the second list and the first list is received by the tool from the remote database for storage in the database.

18. The computing device of claim 14, wherein the database is a predetermined size.

19. The computing device of claim 14, wherein the first list is updated to include the website if the website is not included in the first list and is included in the second list.

* * * * *